United States Patent

Best et al.

[11] Patent Number: 5,928,696
[45] Date of Patent: Jul. 27, 1999

[54] PROCESS FOR EXTRACTING NATIVE PRODUCTS WHICH ARE NOT WATER-SOLUBLE FROM NATIVE SUBSTANCE MIXTURES BY CENTRIFUGAL FORCE

[75] Inventors: Bernd Best, Mörfelden-Walldorf; Karlheinz Brunner, Oelde-Stromberg; Katja Hegwein, Reinheim; Rainer Ricker, Dietzenbach; Rainer Frische, Frankfurt am Main, all of Germany

[73] Assignee: Dr. Frische GmbH, Alzenau, Germany

[21] Appl. No.: 08/793,082

[22] PCT Filed: Aug. 12, 1995

[86] PCT No.: PCT/DE95/01065

§ 371 Date: Feb. 18, 1997

§ 102(e) Date: Feb. 18, 1997

[87] PCT Pub. No.: WO96/05278

PCT Pub. Date: Feb. 22, 1996

[30] Foreign Application Priority Data

Aug. 16, 1994 [DE] Germany .............................. 44 28 924

[51] Int. Cl.$^6$ .............................. A23J 1/14; A23L 1/325; A23L 1/28

[52] U.S. Cl. .......................... 426/417; 426/425; 426/429; 426/430; 426/431; 426/437

[58] Field of Search ................................ 426/7, 417, 430, 426/429, 431, 437, 651, 425, 426, 427, 428, 432, 433, 434, 435, 436

[56] References Cited

U.S. PATENT DOCUMENTS

| | | | |
|---|---|---|---|
| 353,822 | 12/1886 | Sahlström | 426/7 |
| 2,615,905 | 10/1952 | Forstmann | 426/417 |
| 2,820,047 | 1/1958 | King | 426/417 |
| 2,875,061 | 2/1959 | Vogel et al. | 99/7 |
| 3,525,623 | 8/1970 | Osterman | 426/417 |
| 3,565,634 | 2/1971 | Osterman | 426/417 |
| 3,926,940 | 12/1975 | Circle et al. | 260/123.5 |
| 3,941,764 | 3/1976 | Hensarling et al. | 426/656 |
| 4,036,993 | 7/1977 | Ikeda et al. | 426/7 |
| 4,140,805 | 2/1979 | Edwards et al. | 426/429 |
| 4,211,695 | 7/1980 | Oughton | 260/123.5 |
| 4,486,353 | 12/1984 | Matsuzaki et al. | 426/430 |
| 4,961,936 | 10/1990 | Rubin | 426/7 |
| 4,963,370 | 10/1990 | Uchida et al. | 426/7 |
| 5,679,393 | 10/1997 | Laur et al. | 426/417 |
| 5,705,618 | 1/1998 | Westcott et al. | 426/430 |

FOREIGN PATENT DOCUMENTS

| | | |
|---|---|---|
| 0557758 | 9/1993 | European Pat. Off. . |
| 2400552 | 3/1979 | France . |
| 2056896 | 8/1971 | Germany . |
| WO 9325644 | 12/1993 | WIPO . |
| WO 9522590 | 8/1995 | WIPO . |

OTHER PUBLICATIONS

Database WPI, Week 9110, Derwent Publications Ltd., London, GB; AN 91–070562, & JP, A, 03 020 397 (Takao M), Oct. 29, 1991, (see Summary).

Chemical Abstracts, vol. 120, No. 6, Feb. 7, 1994, Columbus, Ohio, US; abstract No. 57141x, Hu, Shaohai et al. "Process of Extracting Tea Oil and Saponin from Tea–oil Seed and Tea Seed dregs", p. 163, col. 1; (see Summary) & CN,A,1 068 360, Jan. 27, 1993.

Journal of the American Oil Chemists' Society, Bd. 61, Nr. 9, 1984 Champaign US, pp. 1457–1460, R.J. Hron, Sr. et al. "An aqueous ethanol extraction process for cottonseed oil" (see the entire document).

*Primary Examiner*—Cynthia L. Nessler
*Attorney, Agent, or Firm*—Lane, Aitken & McCann

[57] ABSTRACT

The extraction of native products is rendered difficult by the fact that attraction forces act between the liquid native products which are not water-soluble and the tissue incorporating them, and that other constituents are dissolved or present in the form of particles in suspension in the products during the extraction process. The initial substance mixture is, therefore, processed together with a water-soluble, organic solvent and optionally water to form a paste. The addition of the water-soluble, organic solvent enables the substance mixture to be separated cleanly into an aqueous phase and an organic phase in the centrifugal field, no further cleaning being necessary for the organic phase. The process according to the invention has a wide area of application. In principle, it can be applied to all substance mixtures containing liquid, organic substances, in particular to vegetable and animal tissue. It is suitable for extracting oils from oleaginous fruit or waxes from wax-containing plants, as well as for extracting fish oil.

22 Claims, No Drawings

PROCESS FOR EXTRACTING NATIVE PRODUCTS WHICH ARE NOT WATER-SOLUBLE FROM NATIVE SUBSTANCE MIXTURES BY CENTRIFUGAL FORCE

This application was filed under 35 USC 371 as the national stage of PCT application PCT/DE95/01065, filed Aug. 12, 1995.

This invention relates to a process for extracting biogenically formed or native, organic substances from biogenic or native substance mixtures, in which the starting material is finely comminuted and made into an aqueous suspension and then separated in the centrifugal field into an aqueous phase containing solid components and a liquid, organic phase. It relates in particular to extraction of fats, oils and waxes from oleaginous plants and vegetable and animal tissues.

For this extraction, oils, fats and waxes have to be separated from the other components with which they are in part intimately mixed or in which they are finely distributed.

Such a process for extracting oils and fats from native products, e.g. oleaginous fruits, with the aid of centrifugal force is already known. In this process the starting products are comminuted and made into an aqueous suspension. This process is used in practice for extracting olive oil. A similar process is undergoing tests for dried oleaginous fruits, wherein water is added with dry starting material. A cream is obtained in the centrifuge through this and then this cream is separated in a centrifuge into oil and non-oil components.

In this process for extraction a residual proportion of non water-soluble, liquid oils and fats remains in the solid phase separated as an aqueous suspension. This applies in particular for oleaginous dried fruits. This residual component is extracted and separated according to the state of the art with suitable, non water-soluble solvents, preferably hexane, again by means of centrifugal force. However, the residual oil extracted in this way contains a substantially higher proportion of components soluble in particular in the solvent.

The process for extracting oils by centrifuging is frequently made difficult because the non water-soluble liquid to be separated forms emulsions which are difficult to break down and complexes with other components of the starting material. The yield is reduced by this. In order to facilitate the separation in the centrifugal field the suspension is therefore subjected to a prolonged preliminary treatment, in that is malaxed at elevated temperature. Residual amounts of the oil nevertheless remain after the separation adsorbed on solid materials of the separated suspension or bound as complexes in the suspension.

This malaxing process can take several hours and can be used successfully only with olive oil fruit. Oils (fats, waxes) which are in contrast intimately bound to solid materials in the raw material cannot not be split off by a malaxing process with the desired efficiency.

This process can further only be carried out under certain conditions with oleaginous dried fruits. It is true that a meal can be made from the dried fruits to get a suitable suspension with suitable addition of water, but this cannot be carried out—even after many hours malaxing—if in fact it goes over in the centrifugal field only into a lighter oil emulsion phase (cream) and a heavy phase containing solids, which still contains substantial amounts of oil.

In DE-OS 2 056 896 there are described
 the extraction of such an oil-containing emulsion, the so-called cream, with the addition of an electrolyte, by use of the centrifugal force in a first step and
 splitting the emulsion in a second step, for example with alcohol or mechanically into clean oil and water phases with residues of solids. The mixture is broken down in known manner by the addition of the electrolyte and the density of the aqueous phase is so enhanced that the following separation into a phase containing oil and a phase containing water is facilitated.

Accordingly a multi-stage process is always used to extract the pure oil phase in the state of the art, which includes in the first step either a tedious malaxing process which is in addition only successful to a limited degree, or the addition of electrolyte with centrifuging, before the second step of the actual oil separation.

A process is also known in which vegetable oils and fats from oleaginous fruits with enhanced oil/fat content are extracted by mechanical pressing. The press cakes always contain residual oil/fat contents, which hardly lie below 7% referred to the dry substance of the press cakes. These residual amounts are derived extractively by solvents, preferably hexane. The solvent is then recovered by distillation.

This process requires investment in pressing and extraction plants. The extracted products moreover contain impurities, such as suspended solids, slimy substances, coloring matter, etc., which have to removed expensively.

The extraction of native oils, fats and waxes is made more difficult firstly in that forces of attraction act between the oil, fat and wax and the tissue in which they are embedded and secondly in that non-oil components are also dissolved with the oil, fat and wax in the extraction and/or are separated as suspended particles. The known processes therefore require an additional, subsequent purification of the extracted oils, fats and waxes.

As against this the object of the invention is to provide a simpler, effective process for extracting non water-soluble native products from the aforesaid substance mixtures. As shown below, these non water-soluble, native products contain not only oils, fats and waxes but also their derivatives, for example products of transesterification and free fatty acids.

By derivatives are to be understood in this connection all liquid subsequent products which are not water-soluble in the extraction process, including the derivatives which are only present in the liquid state at high temperatures, such as cocoa butter for example.

This objects is met by a process according to which a clean oil phase, a water phase and a solids phase freed from oil can be formed in the centrifugal field and be separated in a single step.

Through the addition of water-soluble, organic solvent, the time for the preparation of the suspension is substantially shortened in comparison with conventional processes with long malaxation times. The water-soluble organic solvents are preferably alcohols, especially short chain alcohols, since they dissolve well in water, wherein proportions of 5% by weight to 75% by weight of the total liquid fraction are basically possible, but preferably proportions of about 15% by weight up to about 50% by weight at the most are used. At the limit an effect can be obtained by water-soluble salts and water-soluble solvent mixtures such as ethanol/acetic acid, as explained further below.

Through the addition to the finely milled starting material of a very small amount of water-free organic solvent, such as alcohol for example, it is true that initially no positive effect on the separation is observed. From a certain concentration of water-free organic solvent however a separation surprising occurs into clean oil and residual material. Since the starting material has from its very nature different contents of water, salts, proteins and slimy substances, depending on the oil seed and/or animal material, such as for example fish, fish offal and that from other slaughtered animals, the optimum amount of additive of water-free organic solvent must be determined for each material. As a rule this concentration lies between 15 and 20% by weight of the water-free organic solvent. An approach to the optimum ratio between aqueous and non-aqueous phases is effected by further addition of water-free organic solvent. Higher amounts of added solvent however have a negative effect. Losses in the yield of clean oil occur already before the density of the aqueous phase is equal to the density of the non-aqueous phase or oil phase. Accordingly the amount of added water-free organic solvent should be so selected that the aqueous phase and the dissolved components contained therein amount for preference to 50% by weight at the most.

Basically, just enough of water-free organic solvent is added for a clean, emulsion-free oil phase to result. The oil phase must always be lighter than the aqueous phase for good separation into oil and non-oil components. If this condition is not met or is only met insufficiently, the density can additionally be altered in known manner by the addition of non water-soluble, light solvent, such as hexane for example, and/or by addition of non oil-soluble but water-soluble electrolyte, such as acids and salts for example. The nature and amount of the additive of water-free organic solvent is specific to each material (oil seed or animal material). It is however possible to determine the optimum and thus the upper limit of the addition which exists for each material by a few experiments.

It has surprisingly been found that the capacity to form emulsions and complexes of the system of materials is destroyed by addition of the water-soluble organic solvent. The aqueous and the organic phases form a "clear" phase boundary, a sharp boundary between the organic and the aqueous phases.

After the aqueous phase a "clear" phase boundary and a clear organic phase can be recognized in a centrifuge, e.g. a flask centrifuge. This greatly facilitates the separation of the two phases. Without the addition of a water-soluble solvent however, an emulsion layer forms between the two phases, so that clean separation of the two phases is not possible.

The yield of organic phase to be separated is increased substantially by the clean separation. The residual amounts of the organic phase in the aqueous discharge suspension are insignificant. In addition the extracted, organic liquids contain substantially less "fat-soluble" impurities. The added solvents remain to a largely predominant degree in the separated suspension and can be removed therefrom by distillation.

The separation is effected in a generally known centrifuge. Before the suspension is put in the centrifugal field, it is optionally held for a while at an enhanced temperature, so that a distribution equilibrium is reached.

It is only known from the state of the art (e.g. DE-OS 2 056 896) that the so-called cream for example can be broken down into worthwhile yields inter alia by the effect of alcohol. The derivation of the cream however presupposes the use of an electrolyte in the centrifugal field. According to the state of the art it makes no sense to the man skilled in the art to replace the electrolytes wholly or in part by alcohol, since the alcohol would reduce the density of the aqueous phase and would thus just counteract the opposite effect of the electrolytes. Even more astonishing is the effect described above, that the inevitable reduction in the difference between the densities of the aqueous phase and the oil phase which the addition according to the invention has does not have any negative effect on the separability of the oil phase but rather the addition effects the production of a clean oil or wax phase.

It is already astonishing that a very good separation can be effected with the addition of organic solvents, which allows the separation with dry starting material to be further improved, if the finely comminuted starting material is firstly malaxed with the water-free organic solvent alone, optionally at an enhanced temperature, and then the appropriate amount of water is added. This variant of subsequent addition of water operates to particular advantage with such oleaginous and waxy dried fruits whose water phase would take up slimy substances. An example of such an oleaginous fruit is in particular linseed. However, slimy substances occur also with rape and sunflower seeds for example.

By a dry starting material is to be understood comminuted fruit masses which can be stored, with such a small moisture content (as a rule not more than about 7% to 10%) that no germination occurs.

The process according to the invention is suitable for extracting oils from oleaginous fruits or waxes from vegetable parts containing waxes. The fields of application are not however restricted to these materials, but the process can basically be used with all substance mixtures which contain liquid, organic substances, especially vegetable and animal tissues, such as above all fish.

The man skilled in the art knows that, in contrast to pure herring, in extracting from fish oil a proportion of more than 25% of rose fish in the raw material for example leads to emulsion problems, which make it impossible to separate the oil sufficiently and extract a high-quality fish meal. This problem cannot be solved by malaxing alone. For this reason rose fish waste is always in practice mixed with suitable amounts of waste from other fish, e.g. herring for oil extraction. This case shows that even with apparently similar raw materials (fish) serious differences can occur in the extraction of oil on account of the differences in the chemical nature of the kinds of fish, both of the oils and also of the non-oil components in the fish.

However, in contrast to the prior fish oil extraction processes, the process according to the invention allows separation even from rose fish waste alone with any addition of other fish, of the oil and fat contained therein into a clean oil phase and an aqueous phase, in which non-oil components of the rose fish waste are mainly contained suspended as solids, and thus to extract on the one hand a pure rose fish oil and on the other hand extremely low-fat fish meal.

In the process according to the invention the native products are also extracted more purely than hitherto, so that an additional step of purification is not necessary for many applications, e.g. technical applications.

For some applications however oil or fat freed from free fatty acids is needed. The invention offers a decided advantage here, since it is found that an oil freed from free fatty acids can be separated directly by neutralization with the addition of bases before the centrifuging. This contradicts the normal manner of operation of adjusting the pH value of the suspension to be centrifuged into the non-basic range, in order to use soap/oil emulsions which are difficult to separate.

In the de-acidification in situ according to the invention, an addition of acid-binding substances calculated from the proportion of free fatty acids in the oil of the oil seed is made before the centrifuging, e.g. to the oil seed suspension or the oil seed meal. Such acid-binding substances are calcium oxide, magnesium oxide, sodium hydroxide, potassium hydroxide, potassium carbonate, sodium carbonate as well as sodium and potassium salts of weak acids, especially native fatty acids, for example. The acid-binding substance can be used either in solid or liquid form, say by previous solution in the amount of water required for the extraction process. The addition of the acid binder can also be made already in the milling.

The nature and amount of the respective acid-binding substance depends strongly on the nature and quality of the raw material to have the oil removed. Moreover the nature and amount of the additive is determined by the object to be met. Thus for example, for an oil to be extracted which is merely to have an acid value around 1, substantially less additive is needed than for an oil which has to have an acid value smaller than 0.1.

Basically more is added than is calculated from the acid value, preferably up to about three times the calculated value. It is sufficient if the pH value of the aqueous discharge after the separation lies between about 8.5 and 9.5, differing from the conventional deacidification of raw oils, in which the pH value of the aqueous discharge lies around 10.

The limits for the centrifugal separation according to claim 9 can be taken into account with this addition.

It has been shown surprisingly in the manner of proceeding for the in situ deacidification of the oil that further oil content materials or oil companions, which remain both in the pressing and extraction processes, as also in oil extraction in the normal centrifugal methods, can also be removed. Thus in the manner of proceeding according to the invention the content of dissolved phosphate in the oil for example can already be reduced in the oil extraction to values such as only highly refined vegetable oils normally possess. The same applies for coloring matter, e.g. chlorophyll, dissolved in the oil.

It would be expected in the in situ deacidification according to the invention that the yield of neutral oil would be lower than in an oil extracted with the aid of the centrifugal field but not deacidified in situ by the amount corresponding to the removed free fatty acids. This is however surprisingly not the case. If for example an oil seed is used whose oil has a fatty acid content of 4% by weight referred to the oil contained therein, derived in the centrifugal field without in situ deacidification, there are small losses in yield in that the separated non-oil components contain residual amounts of oil. These can make up 5 to 10% by weight of the dry mass of the non-oil components in this example. If the extractions of the oil is effected in the centrifugal field with the addition of acid binders (in situ deacidification), like yield amounts are obtained until the content of free fatty acids (and thus the amount of base required for the in situ deacidification) is higher that the amount of oil separated with the non-oil components as losses. Apparently the fatty acid soaps resulting from the in situ deacidification displace neutral oil from the non-oil components and are discharged in the process in place of the neutral oils with the non-oil components.

A decided advantage of the in situ deacidification compared with the state of the art, in which deacidification of the oil extract follows on, lies in that the in situ deacidification effects an increase in the extractable amount of neutral oil. With the conventional methods for deacidification however, inevitable losses occur with the separating out of the free fatty acids as soaps, through entrainment of neutral oil.

This effect can be made use of in that free fatty acids or sodium or potassium salts of free fatty acids are added before the oil extraction to a raw material whose content of free fatty acids is lower that the oil loss occurring in the extraction of the oil in the centrifugal field. These then displace the neutral oil from the non-oil components, so that an increase in yield of neutral oil arises.

It is particularly advantageous here to add such fatty acids as those whose subsequent separation is very simple. This is significant e.g. for extracting of high oleic oils, which are to serve for derivation of oleic acid products. If for example lauric acid or palmitic acid is used as additive, these can be separated very simply by distillation from suitable oleic acid products. It should be noted that fatty acid salts occur as lower value products in the usual refinement of oil and thus can be used as a cost-effective additive for the in situ deacidification and/or to enhance the yield of neutral oil.

Deacidification of the oil by the in situ deacidification according to the invention can also be carried out with contents of free fatty acids of more than 10% by weight. According to the state of the art deacidification is no longer possible without great expense with a proportion of more than 10% by weight.

Long chain fatty acids with chain lengths greater than 6 are preferably used and these are neutralized in the extraction process with bases (acid-binding substances) before carrying out the centrifugal process.

It has further been determined that an alcohol added for the centrifugal separation can be used with the addition of the catalyst alcoholate for an in situ transesterification of the neutral oil, e.g. to methyl or ethyl fatty acid esters. The alcoholate contributes a double function, namely that of the catalyst and that of the acid-binding substance.

According to the state of the art, triglycerides can then be basically transesterified with suitable alcohols, if practically no water and no free fatty acids are present. Thus for example neutral oils (triglycerides, diglycerides and monoglycerides) which contain a proportion of free fatty acids of less than 0.1% and are practically free from water are transesterified with alcoholates in suitable alcohols in a very short time to the corresponding esters and glycerines. The glycerine separates out as the most ester insoluble compound as a heavy liquid phase and thus leaves the reaction. Small amounts of free fatty acids are enough to disturb the reaction by forming soaps, so that no further conversion takes place.

Neutral oils are normally brought into contact with basic catalysts with water-free alcohols at enhanced temperature for the purpose of transesterification, and esters and the glycerine are separated from one another. This can in the first place be effected in that the catalyst is applied to a solid carrier and oil and alcohol are brought into contact therewith. At the end of the reaction esters and glycerine result. In another process alcoholate is added to the neutral oil and alcohol mixtures and the transesterification is performed at an enhanced temperature. The reaction mixture is then separated in separators into esters and glycerine.

It has now surprisingly been shown that this transesterification reaction can be carried out directly on dried, finely milled oil seeds. The process can even be carried out when the starting product has a content of free fatty acids in the oil of more than 1%.

The strongly dried oil seeds are thus finely milled or rubbed out and treated briefly with alcohol containing alcoholate. The amount of alcoholate is so calculated that it is higher than the amount needed to neutralize free fatty acids contained in the oil seed. The amount of alcohol can fluctuate within wide limits. In any case however, an amount is needed which is sufficient to saturate the dry starting material intimately. The processes of making methyl esters and ethyl esters are particularly suitable, where the reaction temperature lies in the region of the boiling temperature of the alcohol.

In order to extract the esters which are formed, the material is diluted after the reaction with water to the extent that a 15 to 40% alcoholic water phase is present in the reaction mixture. The level of the alcohol content and also the amount of aqueous solution are determined by the nature of the oil seed employed. Strongly swelling oil seed fruits require more water-alcohol mixture than non-swelling oil seed fruits. The level of the alcohol content can be determined in the preliminary experiment, which checks the composition at which the maximum ester yield results as a clean upper phase. As shown, it can be necessary for the actual transesterification to be effected with very little alcohol but that the reaction mixture must then be displaced by alcohol and water for the separation of the ester. Again, in other cases it can be advantageous to add the necessary amount of alcohol already in the transesterification, so that after carrying out the reaction, only water has to be added.

The process according to the invention thus facilitates not only a very practical extraction of a clean oil phase but also of substances freed practically without additional separation steps from free fatty acids, such as oils and also products of transesterification of these oils.

Furthermore deacidification of the oil can be carried out in the in situ deacidification according to the invention even with contents of free fatty acids of more than 10% by weight. According to the state of the art deacidification with a proportion of more than 10% by weight would not be possible without great expense.

Since processing takes place with higher concentrations of volatile organic solvents it is advantageous if the extraction process takes place under an inert gas, for reasons of safety. It is an advantage in this that there is no contact of the extracted oil with oxygen in the air and that oxidation of oxygen-sensitive oils is thus avoided. This is advantageous particularly for oils and waxes containing unsaturated fatty acids, especially for oils and waxes with multiple unsaturated fatty acids, such as fish oil, linseed oil and tung oil for example.

A further advantage of the process for extraction according to the invention is that no kind of bacterial activity can develop during the entire extraction process. The starting material acts as a bactericide because of the addition of water-soluble organic solvents such as alcohol for example or if required of formic acid. Even decomposition bacteria introduced by the starting material (seed goods or animal material) are killed or rendered inactive in this process.

The process according to the invention will be explained below with reference to concrete examples.

EXAMPLE 1

55 g sunflower seeds were finely milled and stirred to the smoothest possible homogenous suspension with the same amount of water (55 g). The whole amount was divided into two parts of 55 g suspension each and placed in two closable centrifuge glasses of 100 ml capacity.

12.5 g water was added to one part, 12.5 g ethanol to the other part. The centrifuge glasses were then closed and held for one hour in a water bath at 80° C. The glasses were shaken briefly from time to time for improved establishment of equilibrium.

The still hot centrifuge glasses were then placed in a laboratory centrifuge and centrifuged for 5 minutes.
Results In both glasses a bottom sediment of coarse, fibrous solids had settled to approximately the same height. On this sediment there was a further layer of fine solids. The aqueous phase stood above this solids layer.

It is dark brown in the glass without ethanol and still contains suspended matter.

In the glass with the ethanol additive the phase is yellowish brown and clear.

In the glass without the ethanol additive a whitish gray, strongly demarcated emulsion layer floats on the water phase.

In the glass with the ethanol additive on the other hand a "clean" phase boundary can be seen.

The organic oil phase in the glass without the ethanol additive is clearly of smaller amount than that in the glass with the ethanol additive. In addition it is cloudy and colored substantially more darkly.

The oil phase in the glass with the ethanol additive is water clear (clean) and only slightly yellowish.

11.5 ml sunflower oil was extracted from the 55/2 g sunflower seed employed with the addition of ethanol. This corresponds to >37% by weight oil referred to the amount used of oleaginous fruit.

With repeated treatment of the centrifuged solids with a mixture of 12.5 ml ethanol and 27.5 g water (one hour at 80° C. and occasional shaking) no appreciable amount of oil could be extracted after the centrifuging.

The bottom sediment of the sample without addition of ethanol freed from the emulsion layer and the oil phase produced a marked oil layer accounting for some ml with treatment with ethanol/water and subsequent centrifuging.

EXAMPLE 2

This was run like Example 1 but each portion of 25 g sunflower seed had added 25 ml water and
a) without ethanol additive: a further 25 ml water and
b) with ethanol additive: 25 g ethanol.
Results Carrying out the experiment with ethanol 10.0 ml sunflower oil was isolated. This corresponds to 26% by weight of extracted oil referred to the starting amount.

EXAMPLE 3

This was run like Example 1 but 25 g euphorbia lathyris seeds with an oil content of 43% were used for each portion.
Results In the experiment performed with ethanol 11.0 ml euphorbia oil was isolated. This corresponds to 39% by weight of extracted oil referred to the starting amount of oleaginous fruit.

In the experiment performed without ethanol additive only 9 ml oil could be isolated.

EXAMPLE 4

This was run like Example 1 but isopropanol was used as a water-soluble solvent.
Results The same yield of oil referred to the amount of oleaginous fruit employed was obtained as in Example 1.

EXAMPLE 5

This was run like Example 1 but the addition of the water-soluble solvent was effected differently.
a) The solvent was added before the addition of water.
b) Solvent and water were added as a mixture.
a) The mixture was warmed to 70° C. briefly (5 minutes) in between the addition of solvent and the addition of water. After adding the appropriate amount of water the mixture was again warmed briefly (70° C., 5 min) and centrifuged while warm.
b) After the addition of the water/solvent mixture the suspension was warmed to 70° C. for 10 minutes and then centrifuged.

Results

In both cases a clear oil phase resulted. The amount of the oil phase in case a) was * higher by about 5% compared with case b).

EXAMPLE 6

50 g milled product were stirred with 25 g ethyl alcohol in a vessel which could be closed tight, with a capacity of about 200 ml. The vessel was closed tight and heated to 80° C. for about 30 minutes in a water bath. 50 g water were then added, the vessel was closed again and heated to 80° C. for about 30 minutes. The mixture was then centrifuged as hard as possible.

In accordance with the description of the experiment the products set out in Table 1 were processed. 200 ml centrifuge flasks of polypropylene which could be screwed tight were used, which were then centrifuged for 10 minutes at 5000 rpm in a Minfuge GL (Hereaus Company). The water phase was separated by means of separator funnels.

The following table indicates the products which could be used in Example 6 and the amounts of oil obtained.

TABLE 1

| Product | Oil (g) |
| --- | --- |
| Sunflower seeds* | 12.7 |
| Linseeds | 10.2 |
| Crushed coriander | 3.5 |
| Coriander* | 2.8 |
| Soya beans° | 3.8 |
| Almond kernels° unpeeled | 15.7 |
| Ground nuts° (dry roast) | 19.2 |
| Hazelnuts°* | 22.0 |
| Sesame seeds | 16.7 |
| Pumpkin seeds with skins | 13.2 |
| Peach kernels* | 2.0 |
| Mirabelle kernels* | 10.0 |
| Plum kernels | 12.8 |
| Brazil nuts°* | 24.0 |
| Wild cherry kernels | 7.3 |
| Honey melon pips | 1.6 |
| Blue poppy | 16.5 |
| Yellow mustard Zlata | 4.3 |
| Honey flora (Phacelia-BALO) | 0.95 |
| Jojoba nuts | 17.3 |
| Euphorbia lathyris* | 19.7 |
| Italian rape | 9.6 |
| Walnuts | 24.0 |
| Grape pips | 0.9 |
| Cocoa beans° | 14.9 |
| Evening primrose | 5.0 |
| Cashew nuts | 21.5 |
| Nux vomica | 5.3 |
| Pecan nuts | 22.0 |
| Rape | 9.0 |
| HO sunflower seeds* | 20.0 |

°unpeeled kernel
*undried test material

EXAMPLE 7

This was run like Example 6 but the test mixture was not heated. Sunflower seeds were used as the starting material. 7 g oil was obtained.

EXAMPLE 8

50 g linseeds were finely milled and stirred with 25 ml hexane to a homogenous suspension. The mixture was allowed to stand for 15 minutes at room temperature (20–25° C.). 25 g ethanol (industrial) was then added to the mixture and 50 g distilled $H_2O$. The mixture was well homogenized and again allowed to stand for 15 minutes at room temperature (20–25° C.). Then it was centrifuged as hard as possible (5 minutes at 500 rpm).

Three phases formed: A solid phase, an aqueous phase and an organic phase (hexane). The organic phase was separated from the aqueous phase in a separator funnel. The organic phase was distilled on a rotary vaporizer. 9.2 g linseed oil was isolated in this experiment. This corresponds to 18.4% by weight of extracted oil referred to the starting amount.

Another 1 g oil could be obtained by further treatment of the centrifuged solid matter with 25 ml hexane and after centrifuging and distilling off.

EXAMPLE 9

143 g herring, a "wet" product was used. In "wet" products a proportion of water of 25% is taken into account in the computation. The required amount of ethyl alcohol was calculated correspondingly so that a ratio of water to ethanol of 1/0.5 resulted. A homogenous mass was produced in a mixer and was allowed to stand for 30 minutes at 30° C. Then it was centrifuged as hard as possible and the water phase was separated off by means of a separator funnel. 22.0 g oil was obtained.

EXAMPLE 10

Extraction of high oleic oil from euphorbia lathyris 50 g euphorbia lathyris were finely ground in a mill, mixed with 25 g ethanol or isopropanol and homogenized. The mixture was then stirred vigorously for 30 minutes at 60 to 70° C. 50 g water were added and stirred at the same temperature for a further 30 minutes. The mixture was then centrifuged for 10 minutes at 5000 rpm. A separation took place: in the upper phase there was the extracted oil while the residue formed the lower phase. The extracted oil was dried in vacuo.

Yield: 19.5 g high oleic oil including free fatty acids: this corresponds to 39% oil including free fatty acids, referred to the amount of seed material used.

The oil had an FFA content (content of free fatty acids) of 9% by weight referred to the amount of seed material employed and 35.5% by weight of neutral oil was thus extracted.

In order to determine the phosphate content the oil was prepared in accordance with a specification in the form of a "calorimetric determination", as is describe for example in "Anlyse der Fette und Fettproducte" [Analysis of fats and fat products], Kaufmann, p. 482, 483, (1958). The test for phosphate was performed with Merck Aquamerck Phosphate.

EXAMPLE 11

In situ deacidification (Extraction of neutral oil)

The procedure was as in Example 1. Differing therefrom 1.9 g $Na_2CO_3$ were added to the 50 g water and mixture was stirred as in Example 1. The mixture was then centrifuged at 5000 rpm for 10 minutes. The separated oil phase was dried in vacuo. Yield: 19.2 g high oleic oil, FFA content: 0.2% by weight; this corresponds to 38% by weight neutral oil referred to the amount of seed material employed.

EXAMPLE 11a

Performance was effected as in Example 11 with isopropanol. However, instead of 1.9 g $Na_2CO_3$, 3 g of $Na_2CO_3$ was added. The oil extracted by centrifuging had an FFA content of about 0.05% (limit of assurance).

In determining the phosphate content the oil obtained in accordance with Examples 10 and 11a was transformed in accordance with the cited method with MgO into magnesium phosphate. The test for phosphate was carried out with the Merck phosphate test (PMB), Article number: 1.1466.1.

The oil obtained in accordance with Example 10 had a phosphate content 100 times higher than the oil obtained according to Example 11a.

EXAMPLE 12 in situ Transesterification

As in Example 10 100 g euphorbia lathyris (residual moisture 1% by weight) were finely milled and mixed with 50 g methanol. The mixture was warmed to 60 to 70° C. while stirring. In parallel therewith an alcoholate solution of 50 g methanol and 3 g NaOH was prepared. The alcoholate solution was added dropwise to the upper mixture. After the end of the addition stirring was effected for 5 minutes. The mixture was stirred into 200 ml hot water and centrifuged (5000 rpm, 10 minutes). The separated methyl ester was dried at 70° C. in vacuo (20 mbar).
Raw yield: 16.5 g fatty acid methyl ester
Distilled: 15.9 g fatty acid methyl ester.

EXAMPLE 13

Extraction of neutral oil from euphorbia lathyris 130 l isopropanol were placed in a heated stirring kettle under nitrogen flushing.

200 kg seed of euphorbia lathyris were milled in a mill with corundum wheels of the Fryma Company (with an oil content of about 45% by weight of oil and an FFA content of 6% by weight in the oil), metered in through a gas lock and constantly stirred.

The mass was heated to 64 to 67° C. and malaxed for one hour (stirred slowly).

80 l water (65° C.), 20 l soda solution (8 kg $Na_2CO_3$ in 20 l aqueous solution) with 120 l water (65° C.) were metered in and malaxed for a further 1.5 hours.

The mass was pumped by means of a slush pump to a 2-phase decanter of the Westfalia Separator AG Company (500 to 900 l/h), through which the clean oil was separated from the solid and liquid residues. The raw oil still contained small amounts of dissolved water and isopropanol (about 8%).
Yield
Raw oil: 85 l, corresponding to 76.5 kg (with water and isopropanol, without taking into account residual amounts of oil in the decanter and piping system).

Oil: 78.2 l, corresponding to 70.4 kg (after removal of the dissolved water and alcohol, without taking into account residual amounts of oil in the decanter and piping system).

This corresponds to an isolated amount of oil of 35.2% referred to the amount of seed employed.

The acid value was determined by neutralization with KOH, where an acid value of 1 corresponds to neutralization of 1 g oil by 1 mg KOH. The free fatty acids were calculated from the average molar mass of the fatty acids contained in the oil.
Acid value: 0.9
FFA: 0.4%
Residual oil in the dry material 4 to 6% by weight (dry substance)

(This value does not correspond to the equilibrium phase; rather the content of residual oil in the dry material is increased by the start-up phase).

EXAMPLE 14

Extraction of neutral oil from euphorbia lathyris 180 l isopropanol were put into a stirrer kettle which could be heated, under nitrogen flushing.

337 kg euphorbia lathyris (with an average FFA content of 12.5% by weight) were milled and metered in through a gas lock with the addition of 6.9 kg $Na_2CO_3$ and stirred into the isopropanol.

The mass was heated to 64° C. and malaxed for about an hour.

140 l water (70° C.), 40 l caustic soda (1 kg NaOH in 40 l solution) were added in with 100 l water (70° C.) and malaxed for another hour.

The mass was pumped into a 2-phase decanter of the Westfalia Separator AG company by means of a slush pump (500 to 900 l/h), by means of which clean oil was separated from the solid and liquid residues. The raw oil still contained small amounts of dissolved water and isopropanol (about 8%).
Yield
Raw oil: 150 l corresponding to 135 kg (with water and isopropanol, without taking into account residual amounts of oil in the decanter and piping system).

Oil: 138 l corresponding to 124.8 kg (after removal of the dissolved water and alcohol, without taking into account residual amounts of oil in the decanter and piping system).

This corresponds to an amount of oil isolated of 37% by weight referred to the amount of seed employed.
Acid value: 2.5, determined as above.
FFA: 1.2% by weight.
Residual oil in the dry material 4.9% by weight (dry substance). (Slightly increased by oil losses in the start-up phase).

EXAMPLE 15

Extraction of neutral oil from euphorbia lathyris 14 l soda solution (4 kg $Na_2CO_3$ in 14 l aqueous solution) and 130 l isopropanol were fed into a stirrer kettle which could be heated, under nitrogen flushing.

200 kg seed of euphorbia lathyris (with an FFA content of 6% by weight in the oil) were milled in a mill with corundum wheels of the Fryma company, metered in through a gas lock and stirred continuously.

The mass was heated to 60° C. and malaxed for an hour.

The mass was pumped into a 2-phase decanter of the Westfalia Separator AG company by means of a slush pump.

The required amount of 170 l water as metered in in an hour directly ahead of the -decanter. Clean oil and solid and liquid residues were separated in the decanter.
Yield
Raw oil: 55 l corresponding to 49.5 kg (with water and isopropanol, without taking into account residual amounts of oil in the decanter and piping system).

Oil: 50.6 l corresponding to 44.5 kg (after removal of the dissolved water and alcohol, without taking into account residual amounts of oil in the decanter and piping system).
Acid value: 1
FFA: 0.6% by weight.
Residual oil in the dry material 14.6% by weight. (strongly increased by oil losses in the start-up phase).

We claim:

1. A process for obtaining native, organic substances in the form of oils, fats and waxes and their derivatives from native substance mixtures, comprising:

finely comminuting a starting material of the native substance mixtures; and working the finely comminuted native substance mixtures into an aqueous suspension with the addition to the mixtures of water, for mixtures having insufficient water, and at least one water-soluble organic solvent in a proportion to render the suspension having a total liquid fraction separable in one step in a centrifugal field into (a) an aqueous phase containing solid components and the substantially all of the solvent, and (b) a clean and emulsion-free liquid organic phase containing the substances to be obtained, wherein the aqueous phase has a higher density than the organic phase, and the proportion of the water-soluble solvent in the total liquid fraction amounts to about 15% to about 50% by weight, further comprising separating the aqueous suspension in one step in a centrifugal field into the aqueous phase (containing solid components and substantially all of the solvent and having a higher density than the organic phase) and the clean and emulsion-free liquid organic phase (containing the substances to be obtained).

2. A process according to claim 1, wherein the substance mixtures are selected from the group consisting of oleaginous fruits, vegetables and animal tissues.

3. A process according to claim 1, wherein the substance mixtures are selected from the group consisting of sunflower seeds, rape seeds, linseeds, castor oil seeds, soya beans, coriander seeds and calendula seeds, plants containing waxes and fish.

4. A process according to claim 1, wherein the suspension is held at an increased temperature to establish an equilibrium distribution.

5. A process according to claim 1, wherein at least one member selected from the group consisting of light solvents which are not water-solubles and water-soluble electrolytes is added.

6. A process according to claim 1 wherein the native organic substances contain water, the comminuted starting material contains water, and the water-soluble organic solvent is added to the comminuted starting product containing water.

7. A process according to claim 1, wherein the substance mixtures are oleaginous fruits and, prior to the step of finely comminuting, the oleaginous fruits are worked solely with a water-free water-soluble organic solvent into one of a kneadable mass and a stirrable suspension, which is mixed with water to produce the aqueous suspension.

8. A process according to claim 7, wherein the oleaginous fruits are worked into a kneadable mass, and the organic solvent is kneaded into the kneadable mass.

9. A process according to claim 7, wherein the oleaginous fruits are worked into a stirrable suspension, and the organic solvent is stirred into the stirrable suspension.

10. A process according to claim 1, wherein the solvent is an alcohol.

11. A process according to claim 10, wherein the alcohol is selected from the group consisting of methanol, ethanol, propanols and butanols, and mixtures thereof.

12. A process according to claim 1, wherein the native substance mixtures comprise dried oleaginous fruits present in the ratio by weight to the liquid phase of 1:1 to 1:10, and the ratio by weight of solvent to water amounts to 1:1 to 1:5.

13. A process according to claim 12, wherein the dried oleaginous fruits are present in the ratio by weight to the liquid phase of 1:1 to 1:5.

14. A process according to claim 1, wherein acid-binding substances for binding free fatty acids are added, and the suspension is subjected to a centrifugal field.

15. A process according to claim 14, wherein the acid-binding substances are selected from the group consisting of calcium oxide, magnesium oxide, sodium hydroxide, potassium hydroxide, potassium carbonate, sodium carbonate, and sodium and potassium salts of weak acids.

16. A process according to claim 14, wherein the acid-binding substances are native fatty acids.

17. A process according to claim 14, wherein more of the acid-binding substance is added than the amount determined as necessary for neutralization from the acid number.

18. A process for obtaining native, organic substances in the form of oils, fats and waxes and their derivatives from native substance mixtures, comprising:

finely comminuting a starting mateaial of the native substance mixtures; and working the finely comminuted native substance mixtures into an aqueous suspension with the addition to the mixtures of water, for mixtures having insufficient water, and at least one water-soluble organic solvent in a proportion to render the suspension separable in one step in a centrifugal field into (a) an aqueous phase containing solid components and substantially all of the solvent at least to a major part, and (b) a clean and emulsion-free liquid organic phase containing the substances.

wherein the aqueous phase has a higher density than the organic phase, wherein acid-binding substances for binding free fatty acids are added, and the suspension is subjected to a centrifugal field, and wherein the starting material has a lower content of free fatty acids than the expected oil loss in the non-oil components separated by the centrifuging, and a member from the group consisting of free fatty acids and their salts is added before the centrifuging.

19. A process according to claim 1, wherein a member from the group consisting of long chain fatty acids with a chain length at least equal to 6 and the potassium salts and sodium salts of the long chain fatty acids is added.

20. A process for obtaining native, organic substances in the form of oils, fats and waxes and their derivatives from native substance mixtures, comprising:

finely comminuting a starting material of the native substance mixtures; and working the finely comminuted native substance mixture into an aqueous suspension with the addition to the mixtures of water, for mixtures having insufficient water, and at least one water-soluble organic solvent in a proportion to render the suspension separable in one step in a centrifugal field into (a) an aqueous phase containing solid components and substantially all of the solvent, and (b) a clean and emulsion-free liquid organic phase containing the substances to be obtained, wherein the aqueous phase has a higher density than the organic phase, and wherein the substance mixtures are dried oleaginous fruit, the organic solvent is an alcohol containing alcoholate, the alcoholate is an acid-binding substance for binding free fatty acids, and the alcoholate is a catalyst for transesterification of neutral oil present with the alcohol, and wherein the amounts of alcoholate and alcohol are increased for the additional catalyzing action and the transesterification, respectively, relative to the amounts of alcoholate and alcohol needed as the acid-binding substance and the water-soluble solvent.

21. A process for obtaining native, organic substances in the form of oils, fats and waxes and their derivatives from fish material, comprising:

finely comminuting a starting material of the fish material;

working the finely comminuted fish material, which has an unreduced original content of oil, fat and wax, into an aqueous suspension, said aqueous suspension being prepared with the addition of water, for fish material having insufficient water, and with the addition of at least one water-soluble organic solvent in an amount of 15% by weight to 50% by weight of the liquid in the aqueous suspension, the aqueous suspension being subjected to a one-step centrifugal action without any further addition of said water-soluble organic solvent prior to said subjection, wherein said amount of said water-soluble organic solvent is selected such that said one-step centrifugal action produces two liquid phases of different densities separated by a clear phase boundary, including an emulsion-free liquid organic phase containing the substances to be obtained and being substantially free of said water-soluble organic solvent and an aqueous phase containing separated solid components and substantially all of the water-soluble organic solvent, the emulsion-free liquid organic phase having a lower density than the aqueous phase;

and removing said separated emulsion-free liquid organic phase from said aqueous phase to obtain said native, organic substances.

22. A process for obtaining native, organic substances in the form of oils, fats and waxes and their derivatives from native substance mixtures other than fish material, comprising:

finely comminuting a starting material of the native substance mixtures;

working the finely comminuted native substance mixtures, which have an unreduced original content of oil, fat and wax, into an aqueous suspension, said aqueous suspension being prepared with the addition of water, for native substance mixtures having insufficient water, and with the addition of at least one water-soluble organic solvent in an amount of 5% by weight to 75% by weight of the liquid in the aqueous suspension, the aqueous suspension being subjected to a one-step centrifugal action without any further addition of said water-soluble organic solvent prior to said subjection, wherein said amount of said water-soluble organic solvent is selected such that said one-step centrifugal action produces two liquid phases of different densities separated by a clear phase boundary, including an emulsion-free liquid organic phase containing the substances to be obtained and being substantially free of said water-soluble organic solvent and an aqueous phase containing separated solid components and substantially all of the water-soluble organic solvent, the emulsion-free liquid organic phase having a lower density than the aqueous phase;

and removing said separated emulsion-free liquid organic phase from said aqueous phase to obtain said native, organic substances.

* * * * *